Patented Feb. 23, 1954

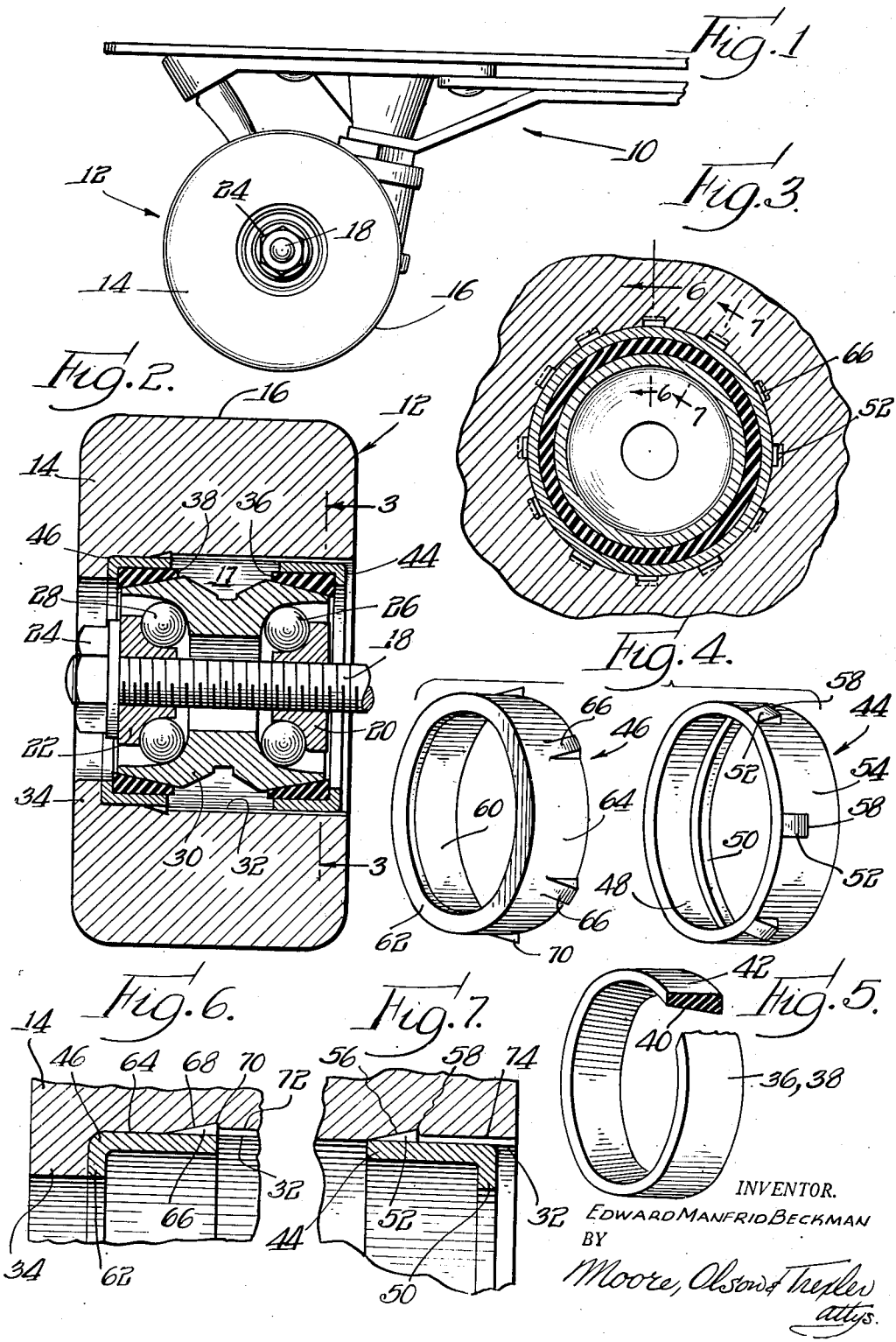

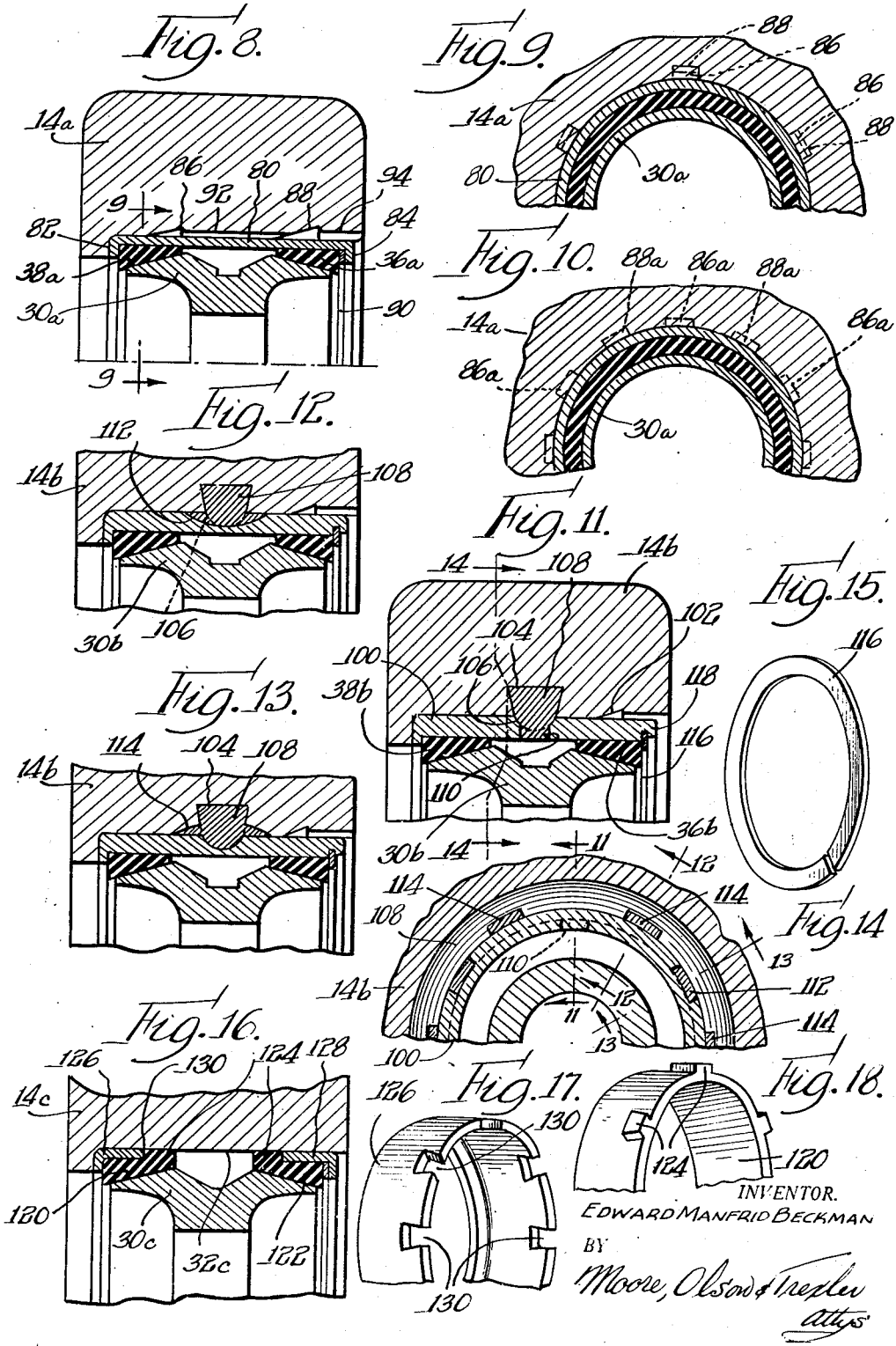

2,670,242

UNITED STATES PATENT OFFICE 2,670,242

ROLLER STRUCTURE

Edward Manfrid Beckman, Chicago, Ill., assignor to Chicago Roller Skate Company, Chicago, Ill., a corporation of Arizona Application June 30, 1948, Serial No. 36,093

3 Claims. (Cl. 301—5.7)

This invention relates to rollers, and concerns particularly rollers of the type used for roller skates, casters, conveyors, and like structures.

In rollers of the type set forth, it is frequently desirable to minimize shock and vibration transmission from the roller axle to the roller tread, or from the tread to the roller, as the case may be; so as to improve the operation of the device with which the roller is associated or incorporated as a part. The transmission of shock and vibration may be minimized, to a degree, by making the roller body of wood, fiber, or other nonmetallic material. However, such structures frequently fail to provide the degree of shock absorption desirable. Moreover, in many instances a type of tread surface is desired, for durability and wear resistance, which reduces the shock absorption qualities of roller bodies of the type stated.

In accordance with the present invention means is provided for absorbing shock and vibration between the roller tread and axle, to a high and desired degree, while at the same time permitting the use of various desired types of body materials and tread surfaces for cooperation with associated parts. Still further, means and methods of construction and assembly are provided for the roller, which facilitate fabrication and promote durability in service.

It is an object of the invention to provide a roller structure, of the type described, of improved construction and improved operating characteristics.

More specifically, it is an object of the invention to provide a roller structure of the type defined, having improved characteristics of shock and vibration absorption between the roller axle and tread, in use.

A further object of the invention is to provide in a roller structure, of the type defined, improved means and methods for fabricating and assembling the structure, and for insuring the durability and permanence thereof throughout its intended life.

Various other objects, advantages and features of the invention will be apparent from the following specification when taken in connection with the accompanying drawings, wherein a preferred embodiment is set forth for purposes of illustration.

In the drawings, wherein like reference numerals refer to like parts throughout:

Fig. 1 is a partial assembly view of a roller skate structure incorporating a roller constructed in accordance with and embodying the principles of the invention, in accordance with one selected embodiment thereof;

Fig. 2 is an enlarged vertical section view of the roller illustrated in Fig. 1;

Fig. 3 is a partial sectional view of the structure of Fig. 2 on the line 3—3 thereof;

Fig. 4 is an exploded perspective view of the retainer rings, forming a part of the roller structure;

Fig. 5 is a perspective detail view of one of the resilient mounting rings;

Figs. 6 and 7 are partial radial sectional views of the roller structure, taken as indicated by the lines 6—6 and 7—7 respectively of Fig. 3;

Fig. 8 is a view similar to Fig. 2, illustrating a modified embodiment wherein the retainer rings are formed into an integral unit;

Fig. 9 is a partial sectional view of the structure of Fig. 8 on the line 9—9 thereof;

Fig. 10 is a view similar to Fig. 9, illustrating a variation of the structure thereof;

Fig. 11 is a view also similar to Fig. 2, but illustrating a further modified embodiment wherein auxiliary retaining means is provided for holding the retainer ring or rings in position, the view being taken as indicated by the line 11—11 of Fig. 14;

Figs. 12 and 13 are views similar to Fig. 11, but taken respectively as indicated by the lines 12—12 and 13—13 of Fig. 14;

Fig. 14 is a partial sectional view of the structures of Figs. 11–13, taken as indicated by the line 14—14 of Fig. 11;

Fig. 15 is a perspective view of an anchor ring, employed in the structure of Figs. 11–14;

Fig. 16 is a view also similar to Fig. 2 but illustrating a still further modified embodiment of the invention; and Figs. 17 and 18 are perspective views of the retainer and resilient mounting rings, respectively, of the Fig. 16 embodiment.

In the drawings the invention has been shown incorporated into a roller skate roller, a use in which it has particular advantage and utility. It is understood, however, that the roller may also be used to advantage in various types of structures, such for example as casters and conveyors, wherein comparable operating problems are presented, or wherein the characteristics of the roller of the present invention may be desired.

Referring more specifically to the drawings, and first to the structural embodiment illustrated in Figs. 1–7, in Fig. 1 there is illustrated the forward portion of a roller skate, generally indicated by the numeral 10, and which includes a wheel or roller 12 constructed in accordance with the invention. More specifically, referring to Fig. 2, it will be seen that the roller 12 comprises an annular body member 14, preferably of wood, fiber, or the like, having a tread surface 16 and a central chamber 17 within which there is disposed an axle 18 and other parts presently to be described.

The axle 18 may be of any approved type and kind, and provides support for a pair of ball races 20 and 22 properly held in position upon the axle by screw threaded connection therewith, and by means of a lock nut 24 mounted on the axle end. Two sets of antifriction bearing balls 26 and 28 engage between the non-rotatable races 20 and 22, and an annular bushing 30 carried within and rotatable with the wheel body 14. The annular central chamber 17 in the wheel body, within which the bushing 30 is disposed, is defined by an axially extending cylindrical surface 32, and a radially inwardly extending lip or flange formed on the body, at one end of the central chamber, as indicated by the reference numeral 34.

The bushing 30 is provided with surfaces shaped to receive the balls 26 and 28, and is further provided along its outer annular wall with a pair of oppositely tapered frusto-conical surfaces shaped to receive and support a pair of mounting members or rings 36 and 38 of rubber or similar material having desired properties of toughness and resilience. One of the mounting rings is illustrated in perspective detail in Fig. 5. It will be seen that each mounting ring is provided with a frusto-conical inner surface 40 shaped to conform to the frusto-conical co-mating surface of the bushing, and with an outer substantially cylindrical surface, as indicated at 42.

The outer and end face surfaces of the rubber mounting rings are engaged by and received within a pair of retainer members or rings 44 and 46, the detailed structures of which are indicated in Fig. 4. Referring particularly to the retainer ring 44, it will be seen that this ring is provided with an inner cylinder surface 48, an inwardly directed end flange 50, and a series of anchoring lugs 52 disposed at suitably spaced intervals along the outer annular surface 54 of the ring, along the edge thereof remotely disposed in respect to the flange 50. As best shown in Fig. 7, the outer surfaces of the lugs are tapered, as indicated at 56, so as to provide biting edges 58 at one end of each lug, extending radially outwardly from the ring wall surface 54.

The retainer ring 46 is constructed generally similarly to the ring 44, except for the arrangement of the anchorage lugs, and is provided with an inner cylindrical surface 60, an inwardly directed end flange 62, and an outward cylinder surface 64 along which anchorage lugs as indicated at 66 are disposed at suitably spaced intervals. Preferably the spacing of the lugs 66 is substantially the same as the spacing of the lugs 52, for a purpose as will presently appear, there being six anchorage lugs provided on each retainer ring in the particular embodiment of the invention disclosed. As best shown in Fig. 6, the lugs 66 are provided with tapered outer surfaces 68 defining biting lug edges 70, functionally similar to the edges 58 of the ring 44, but extending away rather than toward the inwardly extending ring flange.

The retainer rings 44 and 46 are firmly mounted within the central chamber of the roller body, by means of the several anchorage lugs provided, the retainer rings in turn providing firm support for maintaining the resilient mounting rings 36 and 38 in position. More particularly referring to Figs. 2 and 6, it will be seen that the retainer ring 46 lies within the body chamber and abuts the inwardly extending body flange 34. The outer surface 64 of the ring is substantially commensurate in size with the body surface 32, whereby the ring may be press fitted into position, and so that during the press fitting operation the lugs 66 will be caused to form a series of axially extending grooves 72 at spaced intervals along the cylindrical body surface 32. The grooves thus formed, due to the compressibility of the body material, will be materially more shallow than the radial height of the anchorage lugs, whereby the lug biting edges 70 are caused to grip and anchor securely into the body material as the retainer ring reaches seated position.

In assembling the roller structure, the retainer ring 46 is first inserted into the body, after which the mounting ring 38, the bushing 30, and the mounting ring 36 may be sequentially assembled. The retainer ring 44 is then inserted into the body chamber, the anchorage lugs 52 cutting grooves 74, Fig. 7, into the body, in the same manner as previously described in reference to the grooves 72. As best shown in Fig. 3, preferably the rings 44 and 46 are applied so that their anchorage lugs are annularly displaced in respect to each other, so as to avoid the superimposition of the grooves 72 and 74. As will be understood, the number and size of the anchorage lugs may be selected and varied, in accordance with the character of the material of which the roller body 14 is formed. As will be further understood, the metal ring may be applied around the external surface of the body 14, so as to form a metal wear surface or tread, should such be desired.

In operation, it will be seen that the resilient mounting rings 36 and 38, interposed between the body 14 and the axle 18, provide a vibration and shock absorbing structure, whereby to minimize shock transmission from the axle to the roller body, or from the roller body to the axle, as the case may be. Further, such shock absorption is insured, irrespective of the material of the roller body, which may be selected to have the hardness and surface characteristics desired in respect to the devices or structures (such, for example, as the floor in the case of a roller skate) with which the roller body is to be engaged.

The arrangement of the retainer rings 46 and 48 provides a firm anchorage for the mounting rings, enabling them to absorb both axial and radial stresses transmitted by the axle and roller body. The arrangement of the anchorage lugs 52 and 66 insures the firm retention of the anchorage rings within the roller body, resistant to shock and stresses of use, and also of maintained effectiveness, notwithstanding the expansion or contraction of the roller body, within limits, due to moisture absorption and the like. More particularly, the differential between the depth of the grooves 72 and 74 and the radial height of the anchorage lugs insures a firm retention of the retainer rings in position, even though the roller body should expand due to aging, in the case of fiber, or moisture absorption, in the case of wood.

In Figs. 8 and 9 a modified structural embodiment of the invention is illustrated which differs essentially from the structure previously described in that the retainer rings are formed as a single piece, and the retainer and rubber mounting rings are preferably formed with the annular bearing bushing as a prefabricated assembly which may be mounted within the wheel body as a unit.

More particularly, referring to Figs. 8 and 9, the wheel body 14a, annular bearing bushing 30a, and rubber mounting rings 36a and 38a are functionally similar to the corresponding parts in the embodiment previously described, and have been designated with corresponding reference numerals. The retainer structure, however, is in this instance formed as a single ring member 80 of generally cylindrical shape and provided with inwardly turned flanges 82 and 84 at its opposite ends. To retain the ring 80 within the wheel body it is illustrated as being provided with two sets of annularly disposed anchor lugs 86 and 88, the lugs 88 being larger than the lugs 86 and being in alignment therewith in the structure of Figs. 8 and 9. A washer member 90 is held in position by the flanges 84, in abutting engagement with the rubber mounting ring 36a.

In assembling the structure of Figs. 8 and 9, the rubber mounting rings 36a and 38a, the retainer ring 80, and the washer 90 may be assembled in position upon the bushing 30, prior to the turning in of the ring flange 84. As the flange 84 is then formed, it will be seen that the parts enumerated are thereby formed into a single assembly which may be inserted as a unit into the wheel body 14a, thus facilitating the mounting and assembly of the parts. As previously described, the anchor lugs 86 and 88 engage into the material of the wheel body, forming a firm anchorage and retaining means for the retainer ring 80. Although the lugs 86 and 88 are in alignment, the larger lugs 88 properly grip into the groove 92 formed by the smaller lugs, thereby producing a deeper groove as indicated at 94 to facilitate their own gripping action.

In Fig. 10 a structure is illustrated which is the same as in Figs. 8 and 9, except that the two sets of anchor lugs may preferably be of the same size and are radially displaced as indicated at 86a and 88a respectively.

In Figs. 11-15 an embodiment of the invention is illustrated, generally similar to the structures of Figs. 8-10, but wherein additional and more positive means is provided for holding the retainer ring in position.

Referring to Fig. 11, the wheel body 14b, the annular bushing 30b, and the rubber mounting rings 36b and 38b are similar to the corresponding parts in the previously described embodiments, and have been correspondingly numbered. The retainer ring 100 is in this instance a single member, as in Figs. 8-10, retained within the wheel body by an annular series of anchor lugs as indicated at 102.

However, in this instance the anchor lugs are not solely relied upon to retain the ring 100 in position, and to this end the wheel body and retainer ring are provided with aligned annular grooves 104 and 106 into which a body of babbitt or the like 108 may be poured for anchorage purposes after the retainer ring 100 has been pushed into the wheel body. To permit the pouring of the babbitt, the retainer ring 100 is provided with a pair of oppositely disposed openings leading to the annular groove 106, one of such openings being indicated at 110 in Figs. 11 and 14. It will be seen that the babbitt body, within the aligned wheel and retainer ring grooves, firmly holds the retainer ring 100 from axial withdrawal from the wheel body.

In order to insure retention of the retainer ring 100 against rotational movement in respect to the wheel body, the retainer ring is provided at spaced intervals along the channel or groove 106 with a series of widened recesses 112, Fig. 12, and the wheel body is similarly provided along its groove 104 with a series of widened recesses 114, Fig. 13; these recesses providing a firm anchorage for the babbitt body or ring both in respect to the wheel body and the retainer ring 100 so as to preclude relative rotational movement therebetween.

In assembling the structure of Figs. 11-15 the retainer ring 100 is first inserted into the wheel body, and the babbitt anchorage ring formed. The rubber mounting rings 36b and 38b, and the annular bushing 30 are then mounted in position, after which a split ring washer 116 is snapped within a groove defined by a preformed flange 118 of the retainer ring 100.

In certain instances the more positive anchorage means for the retainer ring or rings, as in the structures previously described, may not be necessary. In Figs. 16-18 a structural embodiment of the invention is illustrated wherein protuberances upon the rubber mounting rings are relied upon to retain the assembly together. In this instance the rubber mounting rings 120 and 122, one of which is shown in detail in Fig. 18, are provided with an annular series of protuberances or projections as indicated at 124. The metal retainer rings 126 and 128 are provided with corresponding recesses or cutout portions as indicated at 130, as best shown in Fig. 17, to receive the protuberances of the rubber mounting rings, whereby such protuberances may directly engage the internal cylindrical bore 32c of the wheel body.

In the assembly of the structure, the rubber mounting rings are preassembled into the retainer rings, the protuberances 124 and the cutouts 130 being dovetailed, as shown, to facilitate the retention of the parts. As the complete unit is then assembled, as shown in Fig. 16, and the retainer 128 pressed forcibly to the left, as shown, the several protuberances 124 of the rubber mounting rings will be firmly expanded and engaged against the cylindrical bore of the wheel body, whereby to anchor the parts.

It is obvious that various changes may be made in the particular embodiments set forth, without departing from the spirit of the invention. The invention is accordingly not to be limited to the particular embodiments shown and described, but only as indicated in the following claims.

The invention is hereby claimed as follows:

1. A roller comprising a body having a central chamber, a bearing bushing within said chamber, a pair of rings of resilient material embracing the bushing adjacent the opposite ends thereof for supporting the bushing, and means for anchoring said rings in position in respect to the body, said anchoring means comprising a pair of annular members respectively embracing the rings, and an annular lip formed on the body in engagement with at least one of said annular members, said lip extending radially inwardly and engaging the outer edge of said last mentioned annular member.

2. A roller comprising a body having a central chamber, a bearing bushing within said chamber, a pair of rings of resilient material embracing the bushing adjacent the opposite ends thereof for supporting the bushing, and means for anchoring said rings in position in respect to the body, said anchoring means comprising a pair of annular members embracing the rings, an annular lip formed on the body engaging one of said annular members, said lip extending radially inwardly and engaging the outer edge of said last-mentioned annular member, and a plurality of lugs on the other annular member embedded into the body material.

3. A roller skate wheel comprising a body having an axially extending substantially cylindrical central chamber formed therein, a flange formed on one of the axial ends of said body and extending radially inwardly to partially close one end of said chamber, a bearing bushing substantially centrally disposed within said chamber, said bearing bushing having a pair of oppositely tapered outer marginal surfaces adjacent the opposite ends thereof, a pair of resilient rings shaped complementary to said tapered surfaces engaging said surfaces, retainer means positioned between said rings and said body, inwardly directed flanges formed on the outwardly disposed edges of the retainer means, one of said last-mentioned flanges abutting against the flange on said body, the flanges on said retainer means engaging the outwardly disposed edges of the rings to hold said rings in operative position, and means embedded in said body and connected to said retainer means for interlocking the retainer means in respect to the body and preventing axial displacement of the rings with respect to the body.

EDWARD MANFRID BECKMAN.

References Cited in the file of this patent

UNITED STATES PATENTS

| Number | Name | Date |
|---|---|---|
| 635,575 | McHugh | Oct. 24, 1899 |
| 1,795,821 | Baldwin | Mar. 10, 1931 |
| 1,851,561 | Baninger | Mar. 29, 1932 |
| 1,909,100 | Geyer | May 16, 1933 |
| 1,923,601 | Weaver | Aug. 22, 1933 |
| 2,141,122 | Boden | Dec. 20, 1938 |
| 2,282,589 | Mayne | May 12, 1942 |
| 2,295,139 | Topanelian | Sept. 8, 1942 |
| 2,333,400 | Ware | Nov. 2, 1943 |
| 2,424,784 | Ware | July 29, 1947 |
| 2,476,193 | Hirschmugl | July 12, 1949 |